Figure 6:
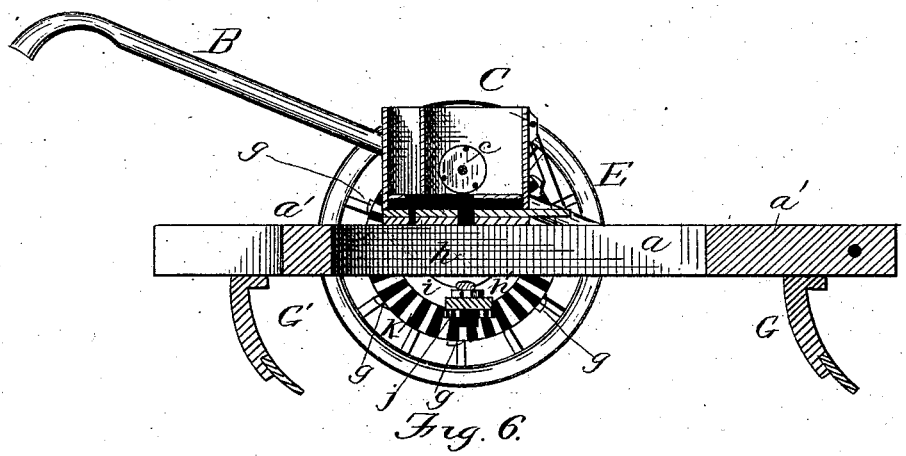

(No Model.)  2 Sheets—Sheet 1.
J. B. NELSON.
COMBINED COTTON, CORN, AND PEA PLANTER AND FERTILIZER DISTRIBUTER.
No. 289,694. Patented Dec. 4, 1883.
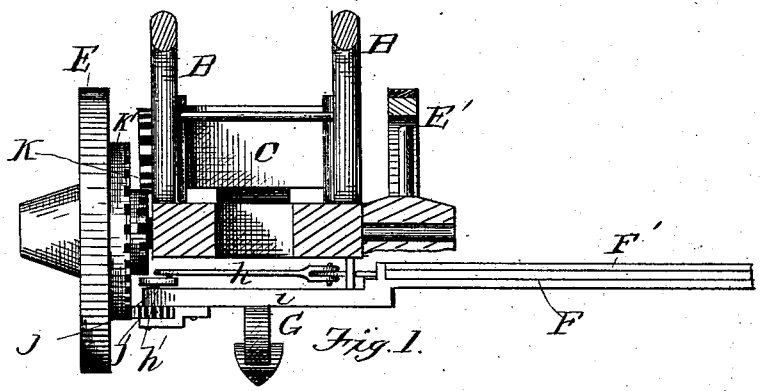
Fig. 1.
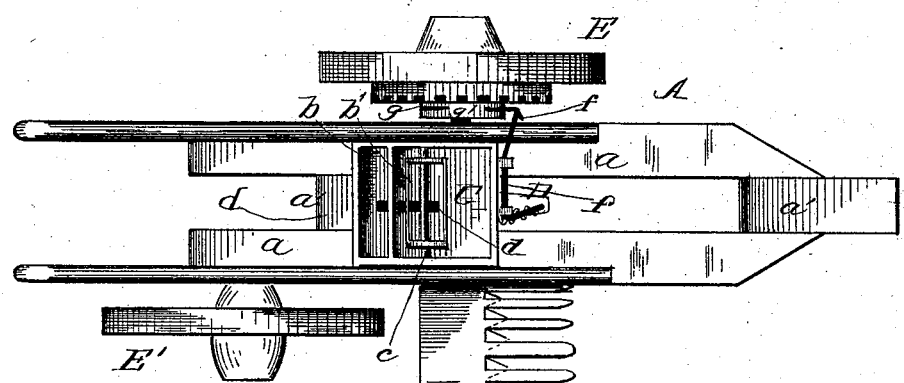
Fig. 2.
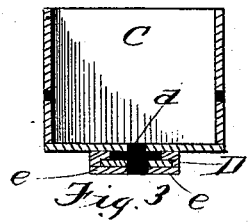
Fig. 3.
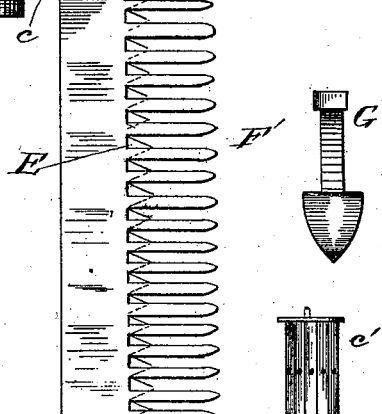
Fig. 4.
Fig. 5.
Witnesses:
Wm. S. Duvall,
H. J. Fouhard.
Inventor:
John B. Nelson
Per Edson Bro's,
Atty's.

(No Model.)  2 Sheets—Sheet 2.

J. B. NELSON.
COMBINED COTTON, CORN, AND PEA PLANTER AND FERTILIZER DISTRIBUTER.

No. 289,694.   Patented Dec. 4, 1883.

UNITED STATES PATENT OFFICE.

JOHN B. NELSON, OF VIOLA, TEXAS.

COMBINED COTTON, CORN, AND PEA PLANTER AND FERTILIZER-DISTRIBUTER.

SPECIFICATION forming part of Letters Patent No. 289,694, dated December 4, 1883.

Application filed June 6, 1883. (No model.)

*To all whom it may concern:*

Be it known that I, JOHN B. NELSON, a citizen of the United States, residing at Viola, in the county of Cass and State of Texas, have invented certain new and useful Improvements in Combined Mowers and Seed-Planters; and I do declare the following to be a full, clear, and exact description of the invention, such as will enable others skilled in the art to which it appertains to make and use the same, reference being had to the accompanying drawings, and to the letters or figures of reference marked thereon, which form a part of this specification.

This invention pertains to improvements in a combined cotton, corn, and pea planter and fertilizer-distributer; and it consists of the construction and combination of parts, substantially as hereinafter more fully set forth and claimed.

In the accompanying drawings, Figure 1 is a vertical section of my improved mower, corn, cotton, and pea planter and fertilizer-distributer. Fig. 2 is a plan view thereof. Figs. 3, 4, and 5 are detail views, and Fig. 6 is a longitudinal section of the same.

A refers to a frame composed of two longitudinal bars, $a\ a$, suitably connected and secured together by short cross-pieces $a'$, preferably about the thickness or width of one of the side bars of the frame.

To the upper side, about at the middle of the frame-bars $a\ a$, are secured the guiding-handles B B of the machine, disposed to extend upwardly and rearwardly, as usual. Between these handles and secured upon the frame A is the seed or fertilizer hopper C, which is divided longitudinally into two compartments—a smaller and a larger one—$b\ b'$. Within the larger compartment, $b'$, may be hung either the fertilizer-agitator or the cotton cylinder or feeder $c'$, Fig. 5, that feeds the fertilizer or cotton-seed, as the case may be, through the narrow long opening $d$, made transversely through the bottom of the hopper and extends from one compartment to the other.

D is the seed or fertilizer dropping slide, adapted to be supported upon ways $e$, depending from the under side of the hopper C, and having in it coincident openings with the opening $d$ in the bottom of the hopper C. Said slide is operated or reciprocated by means of a crank-shaft, $f$, connected thereto and having its bearings in supports on the front side of the hopper, the outer end of said shaft being disposed so as to be intermittently struck or operated by a series of projections or cams, $g$, arranged at suitable intervals apart on an annular extension or hub, $g'$, of the driving-wheel E, on an axle secured to a frame, A. The other wheel, E', arranged on the opposite side of the frame A, is placed in rear of a plane passing transversely through the driving-wheel E, as seen in Fig. 1, to permit the arrangement directly opposite to the driving-wheel of the cutter and finger bars of the mower.

F is the cutter-bar, arranged to operate as is usual upon the finger-bar F', the latter being supported by suitable means secured at one end to the under side of about the middle of the frame A. The cutter-bar is connected by a pitman, $h$, to an eccentric, $h'$, supported upon an extension, $i$, of the finger-bar. The axis of the eccentric passes through said cutter-bar extension and bears in a step, and is provided at its lower end with a pinion, $j$, adapted to engage with an inside circle of cogs, $k$, on a second annular extension, $k'$, of the driving-wheel, the function of the foregoing being to transmit motion of the usual character (an intermittent one) to the cutter-bar.

G G' are the plows and standards, the latter being secured, one to the rear under-side portion of the frame A and the other to the forward under-side portion of said frame, and are designed to furrow and cover the ground for the reception of the fertilizer or the cotton, corn, or peas while being dropped. By removing the cutter-bar or mower and one of the plows and disengaging the other parts from the driving-wheel, the machine may be used as a cultivator.

I claim and desire to secure by Letters Patent—

The seed-slide with its openings adapted to be moved coincidently with a single opening or slot extending from one chamber of the hopper to the other, one of the compartments of the hopper having an agitator, in combination with the seed-slide, crank-shaft $f$, connected to said slide and having its bearings in supports on the side of the hopper, and the cams or projections spaced apart upon the extension of the hub, substantially as and for the purpose set forth.

In testimony whereof I affix my signature in presence of two witnesses.

JOHN B. NELSON.

Witnesses:
 T. A. MILES,
 J. J. EVANS.